United States Patent
May et al.

(10) Patent No.: US 12,221,041 B2
(45) Date of Patent: Feb. 11, 2025

(54) DOOR MIRROR HARNESS SEALING SYSTEM AND METHOD

(71) Applicant: Honda Motor Co., Ltd., Tokyo (JP)

(72) Inventors: Hunter May, Columbus, OH (US); Timothy J. Rupp, Dublin, OH (US); Babuji K. Tamarapoo, Powell, OH (US); Hirofumi Takemoto, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 154 days.

(21) Appl. No.: 18/306,313

(22) Filed: Apr. 25, 2023

(65) Prior Publication Data

US 2024/0359646 A1 Oct. 31, 2024

(51) Int. Cl.
*B60R 16/02* (2006.01)
*H02G 15/013* (2006.01)

(52) U.S. Cl.
CPC ....... *B60R 16/0222* (2013.01); *H02G 15/013* (2013.01)

(58) Field of Classification Search
CPC ............ B60R 16/0207; B60R 16/0222; H02G 15/013
See application file for complete search history.

(56) References Cited

U.S. PATENT DOCUMENTS

| 5,626,167 | A | 5/1997 | Streit |
| 9,327,660 | B2 | 5/2016 | Suetani et al. |
| 9,732,888 | B2 | 8/2017 | Shiga et al. |
| 2006/0278423 | A1* | 12/2006 | Ichikawa ............ H02G 3/0462 174/72 A |
| 2014/0034383 | A1 | 2/2014 | Hayashi et al. |
| 2015/0364233 | A1 | 12/2015 | Asami et al. |
| 2016/0167602 | A1 | 6/2016 | Iwata |

FOREIGN PATENT DOCUMENTS

| EP | 2161787 B1 | 10/2014 |
| JP | 2001283649 A | 10/2001 |
| JP | 2013037801 A | 2/2013 |
| WO | 2012153436 A1 | 11/2012 |

\* cited by examiner

*Primary Examiner* — Paresh Paghadal
(74) *Attorney, Agent, or Firm* — Plumsea Law Group, LLC

(57) ABSTRACT

A sealing system and method for a mirror assembly of a vehicle is provided. The mirror assembly includes a wire harness assembly in which at least a first wire harness and a second wire harness are coupled together. The first wire harness is protected within a rigid encasing but for an exposed portion. The exposed portion permits freer movement of the internal pins in that area, which promotes a better fit with the adjacent second wire harness. In one example, a foam sheath can used to cover a portion of the wire harness assembly, which is then routed through a gasket. This arrangement is configured to prevent air leaks that might otherwise occur due to gapping between the first wire harness and the second wire harness.

20 Claims, 5 Drawing Sheets

DOOR MIRROR HARNESS SEALING SYSTEM AND METHOD

BACKGROUND

The present disclosure generally relates sealing systems and methods for a side-view mirror provided at a side of, for example, a vehicle, and more particularly relates to the technical field of sealing systems which stabilize the fixed connection to the mirror and reduce wind noise.

Generally, a vehicle body is provided with various moving parts, for example, a trunk lid and a tailgate, as well as front and rear doors. The moving parts are mounted or otherwise secured within fixed mounting parts of the vehicle body in such a way as to be openable and closeable. Mirror assemblies for a vehicle side door generally includes a housing, which has a glass assembly mounted thereto, supported on a support arm affixed to the vehicle side door. Typically, the housing is configured to rotate around an inner base member of the support arm in a way that allows the housing to fold forward or rearward, which is useful during an impact or preventing damage when parked.

At the intersection between the two vehicle parts, gaps are inevitably formed between the moving parts and the fixed parts of the vehicle body. Such gaps are generally referred to as seal gaps. The seal gaps provide the necessary clearance to prevent interference between the moving part and the mounting part. However, while a vehicle is operating, air, water, or other fluids may enter through the seal gaps into the vehicle, and contribute to wind noise concerns. For example, such intrusive elements can damage the components, as well as contribute to undesirable noise during operation of the vehicle, particularly at high speeds.

There is a need in the art for a sealing assembly that reduces the acoustic interference and air leakage that has been conventionally associated with the interface between the side mirror and vehicle body, and addresses the shortcomings described above.

SUMMARY

The disclosed embodiments provide methods and systems for improving performance of mirror assemblies in vehicles, and specifically to reduce noise that is generated from the side-view mirror connection mechanism around the wire harness assembly.

In one aspect, a method directed to sealing a wire harness assembly for a door mirror of a vehicle is disclosed. The method includes a step of obtaining a first wire harness that is surrounded by a rigid encasing, and a step of removing a first portion of the rigid encasing along a first portion of the first wire harness to obtain a flexible segment and exposing a set of pins running through an interior of the first wire harness. The method also includes a step of coupling the first wire harness to a second wire harness by wrapping together, using a fabric-based tape, the flexible segment to an adjacent segment of the second wire harness, thereby forming a wire harness assembly.

Another aspect provides a sealing system for a mirror assembly of a vehicle. The system includes a first wire harness including a first segment and a second segment, where the first segment is surrounded by a rigid encasing and the second segment including an intermediate region in which a plurality of pins traveling through the first segment and the second segment are exposed. The sealing system can further include a second wire harness coupled to the first wire harness by a fabric-based tape wrapped around the second segment and an adjacent segment of the second wire harness.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1A:
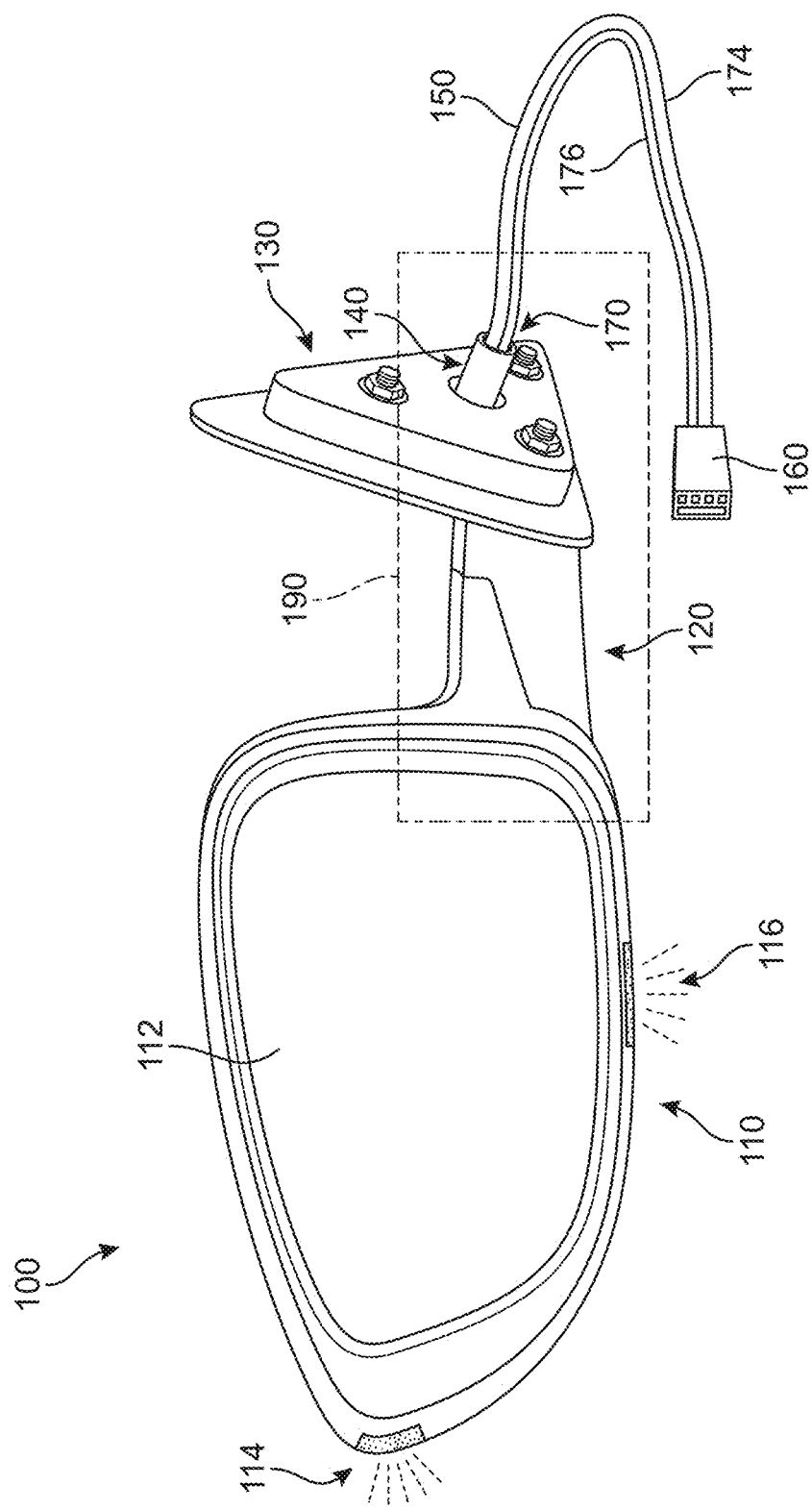
FIG. 1A presents a perspective schematic view of one example of a mirror assembly for a vehicle, according to an embodiment.

Referring to FIG. 1A, an example of a side-view mirror assembly ("assembly") 100 is shown for purposes of introduction. The assembly 100 includes a mirror housing 110 holding a mirror 112, a swivel arm 120, and a plate body 130, where the mirror housing 110 is joined to the plate body 130 via the swivel arm 120. As a general matter, the side-view mirror (or side mirror), also known as a wing mirror, is a mirror placed on the exterior of motor vehicles for the purposes of helping the driver see areas behind and to the sides of the vehicle, outside the driver's peripheral vision (in the "blind spot"). Almost all modern cars mount their side mirrors on the doors-normally at the A-pillar—rather than the wings (the portion of the body above the wheel well), though the proposed embodiments can be understood to be appropriate for either configuration. The mirror housing 110 is typically rotatable with respect to the plate body 130 by way of the swivel arm 120.

A side mirror is often equipped for manual or remote vertical and horizontal adjustment so as to provide adequate coverage to drivers of differing height and seated position. Remote adjustment may be mechanical by means of Bowden cables, or may be electric by means of geared motors. The mirror glass may also be electrically heated and may include electrochromic dimming to reduce glare to the driver from the headlamps of following vehicles. Increasingly, the side mirror also incorporates the vehicle's turn signal repeaters 114, for example along the exterior of the mirror housing 110, as well as puddle lights 116. These and other electronics or electrical features (e.g., heating elements, side mirror power adjustment motors, electrical connectors, mirror switches with directional controls, fused power mirror circuits, etc.) are thus dependent on the transfer of power from a location remote relative to the assembly 100. It may be appreciated that such elements must also receive and transmit control signals. In different embodiments, a wire harness assembly 150 is thereby routed from the various elements in or around the mirror housing 110, and passes through the swivel arm 120 and the thickness of the plate body 130. The wire harness assembly 150 can then be guided toward the vehicle side through the opposite side of the plate body 130, for example via a gasket nipple ("gasket") 140 that protrudes from the plate body 130. The wire harness assembly 150 may then continue outward for connection with the vehicle's electrical connector (e.g., via male-to-female or other connector arrangement, represented here by a first connector plug 160 at the end of the wire harness assembly 150) for access to a power supply.

For purposes of convenience, the description makes reference to a set of axes. As a general matter, the term "longitudinal axis" as used throughout this detailed description and in the claims refers to an axis that extends in a longitudinal direction, which is a direction extending the length of a component, such as the length of the wire harness between a first end in the mirror housing and a second end that will be connected to the vehicle. In addition, the term "vertical axis" as used throughout this detailed description and in the claims refers to an axis that extends in a vertical direction, for example in FIG. 1A is a direction running from the top of the mirror housing to the bottom of the mirror housing. Similarly, the term "lateral axis" as used throughout this detailed description and in the claims refers to an axis that extends in a lateral direction, which is a direction running a width of each component. Each axis of the three axes may be understood to be orthogonal relative to the other two axes.

Furthermore, the description makes reference to distal and proximal directions (or portions). As used herein, the distal direction is a direction outward or oriented away from what would be a center of the vehicle to which the assembly is connected. Also, the proximal direction is a direction oriented toward a center of the vehicle to which the mirror housing is connected. Thus, a distal side or region refers to a portion of a component that is disposed further from the center and a proximal side or region refers to a portion of a component that is disposed nearer to the center. In this case, the mirror housing is most distal, and the connector plug of the wire harness would be most proximal.

Figure 1B:
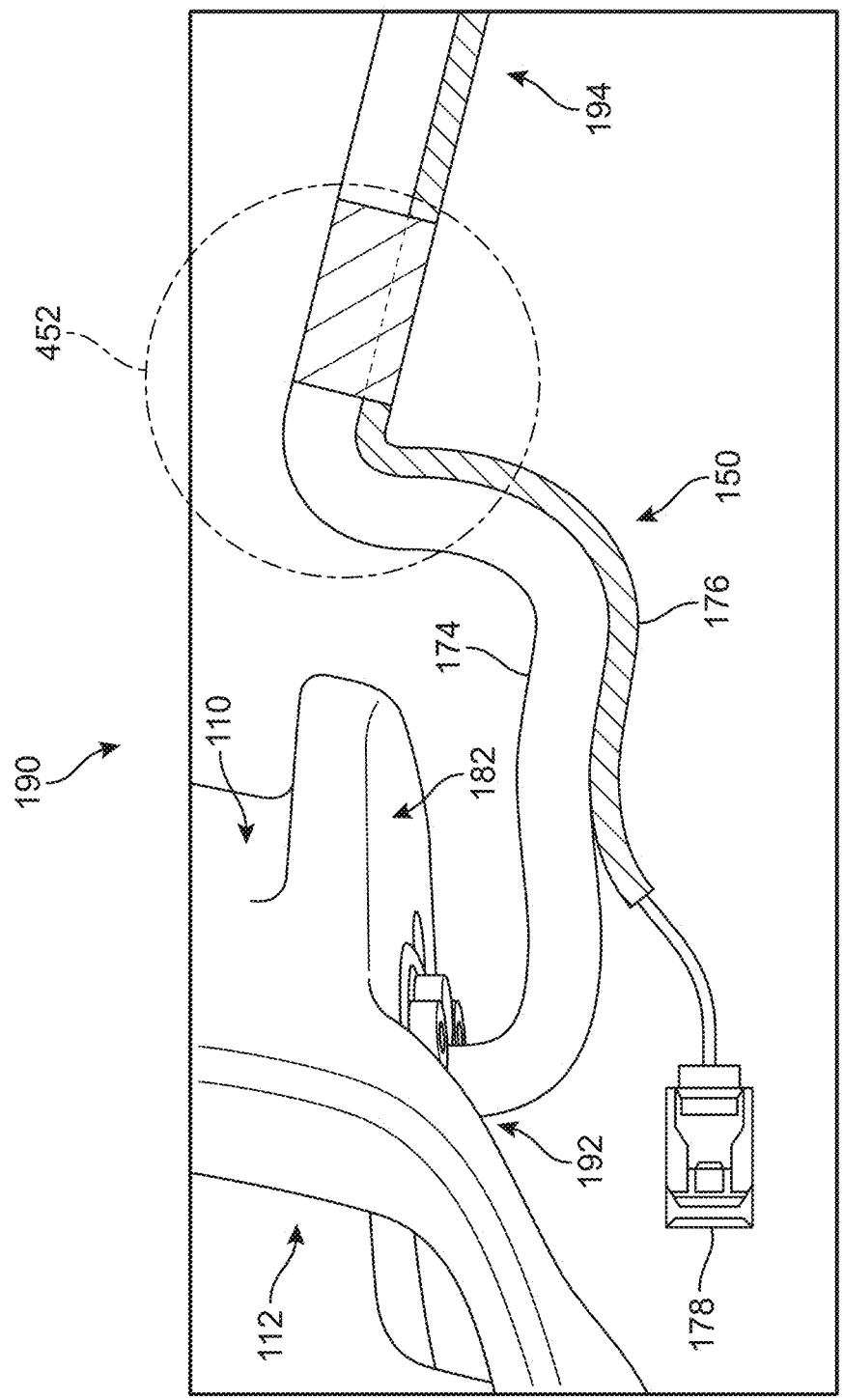
FIG. 1B is a partial view of the mirror assembly of FIG. 1A in which one embodiment of a sealing system has been incorporated, according to an embodiment.

For purposes of clarity to the reader, FIG. 1B illustrates an enlarged, isolated schematic view 190 of one portion of the mirror assembly 100 of FIG. 1A. The view 190 in FIG. 1B includes a portion of the mirror housing 110 as it is separated from the swivel arm 120 and plate body 130 that had been depicts in FIG. 1A, thereby revealing the routing of the wire harness assembly 150 as it travels from a first end 194 (presented as cutaway here) that can be understood to be leading to the first connector plug (not shown in FIG. 1B) to a second end 192 that is toward an opening in a base 182 of the mirror housing 110. Thus, the first end 192 may be referred to as a distal end, and the second end 194 may be referred to as a proximal end of the wire harness assembly 150 for purposes of FIG. 1B.

In FIG. 1B, it may be observed that in some embodiments, wire harness assembly 150 may comprise two or more wire harnesses. For example, wire harness assembly 150 in this case includes a first wire harness ("first harness") 174 and a second wire harness ("second harness") 176. In some embodiments, each wire harness can be configured to transmit power or other electrical signals from the vehicle to different components integrated in the mirror assembly (e.g., the puddle light, the signal light, mirror motors, etc.). In this example, at the second end 192, the wire harness assembly 150 splits into two segments, where the first harness 174 continues into the passage formed in the base 182 of mirror housing 110, and the second harness 176 terminates in a second connector plug 178 that can be connected to a portion of the mirror assembly not shown in FIG. 1B.

Figure 2:
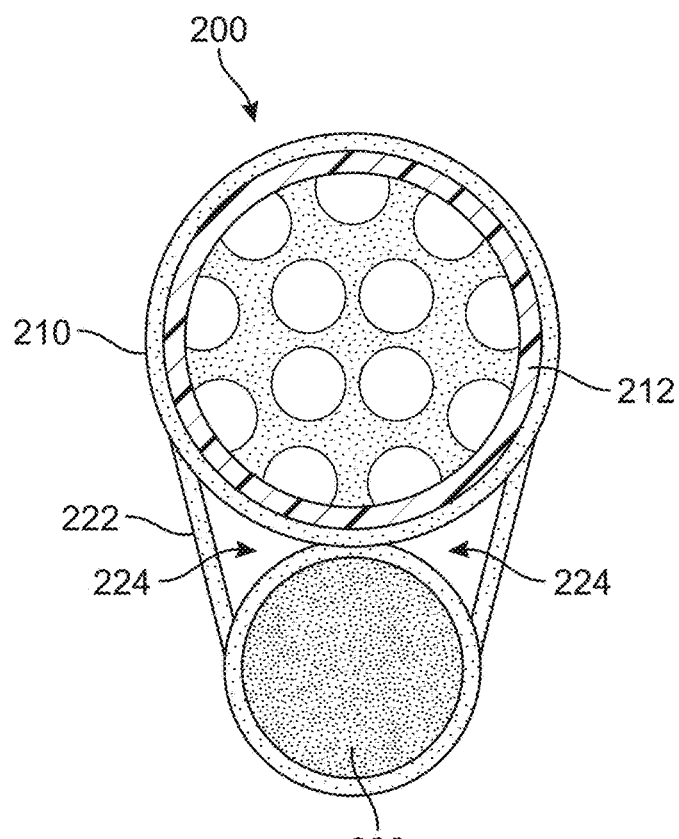
FIG. 2 is a schematic cross-sectional view of a conventional wire harness assembly arrangement for purposes of reference only.

In different embodiments, both first harness 174 and second harness 176 must be routed from their respective starting points within the mirror assembly to the vehicle itself. Returning briefly to FIG. 1A, as the two harnesses together pass through the swivel arm 120 and plate body 130 and the adjacent gasket 140, they may emerge via an opening 170. It can be appreciated that the routing of two separate wire harnesses, while necessary for supplying power to the plurality of electrical elements in the mirror assembly 100, can be associated with drawbacks such as gapping. Simply for purposes of context, one example of a conventional arrangement of a wire harness assembly that combines two wire harnesses is depicted in FIG. 2. In FIG. 2, a cross-sectional view of a conventional wire harness assembly 200 including a third wire harness 210 and a fourth wire harness 220 is presented. It should be understood that an exterior rigid casing 212 (e.g., a high strength thermoplastic material such as polyvinyl chloride (PVC), polystyrene, cellulose acetate, among others) surrounding at least one of the wire harnesses is desirable in order to establish a secure, stable installation of the mirror assembly with the vehicle. For example, conventional arrangements can include a ridged PVC tube that holds the harness pins for ease of mirror assembly. However, PVC tubing and other rigid plastics can be difficult to work with. In some cases, this arrangement is associated with disadvantages in achieving wind noise requirements, typically due to kinking and an inability to seal off fully against the other harness(es). For example, in FIG. 2, while the two harnesses can be held together by a wrapping mechanism 222 there remain gaps 224 within the conventional wire harness assembly 200 between the two components. The cross-sectional view reveals two round or circular shapes associated with the two harnesses that cannot be further merged or aligned. In other words, current arrangements do not prevent air leaks into the vehicle when combining multiple harnesses in the door mirror assembly. Once an assembly incorporating such a conventional arrangement is connected to a car door or other region of a vehicle, these types of inter-harness gaps are associated with a high potential to cause wind noise while driving due to air leaks through each gap, and/or instability of the wire harnesses.

Figure 3:
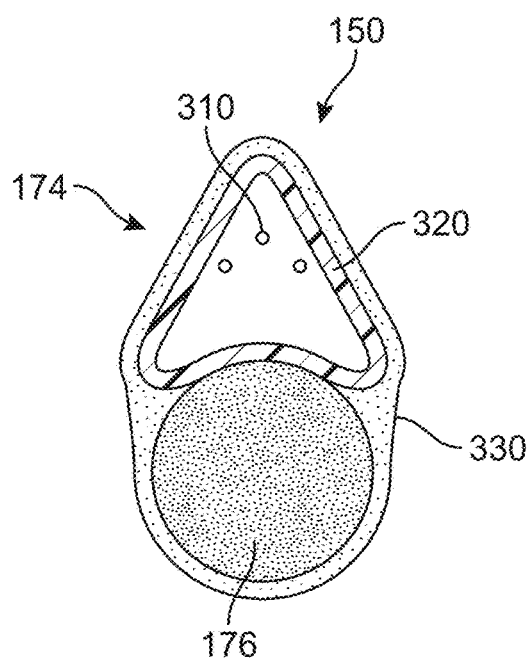
FIG. 3 is a schematic cross-sectional view of a wire harness assembly arrangement of the sealing systems, according to one embodiment.

Moving now to FIG. 3, one embodiment of the proposed systems is now represented in a similar cross-sectional view. As shown in FIG. 3, rather than simply forcing or constraining the two discrete components together, the structural characteristics of at least one harness can be modified to accommodate and align with the structural characteristics of the adjacent harness. This arrangement is directed to mitigating and, in some cases, preventing the occurrence of air leaks into the vehicle itself associated with the conventional mechanical combination of multiple wire harnesses.

More specifically, in some embodiments, at least in those areas of the wire harness assembly 150 where the two wire harnesses are combined or held together, the rigid encasing can be removed or cut off. For example, in FIG. 3, the rigid outer tube has been removed, leaving one or more pins 310 that are carried within the first harness 174 exposed. In some embodiments, the exposed pins 310 can instead be coupled together using a more flexible tape 320 (e.g., PVC tape). The re-structured portion of the first harness 174, now enclosed by a flexible outer sheath, has a decreased area and minimized outer perimeter, and allows for the pins 310 to move relative to one another. Shifting of the pins 310 allows for the profile of the exterior shape of the first harness 174 to respond to the outer shape of the second harness 176. The first harness 174 can then be pressed against the rounder exterior surface of the second harness 176 and shift in shape to hold them in a flush arrangement. The two harnesses can then be maintained in this substantially merged configuration together (e.g., by a wrapping 330 such as cloth or fabric tape, felt tape, soft adhesive, textile, etc.). This arrangement thereby prevents any gapping and associated air leaks.

Figure 4:
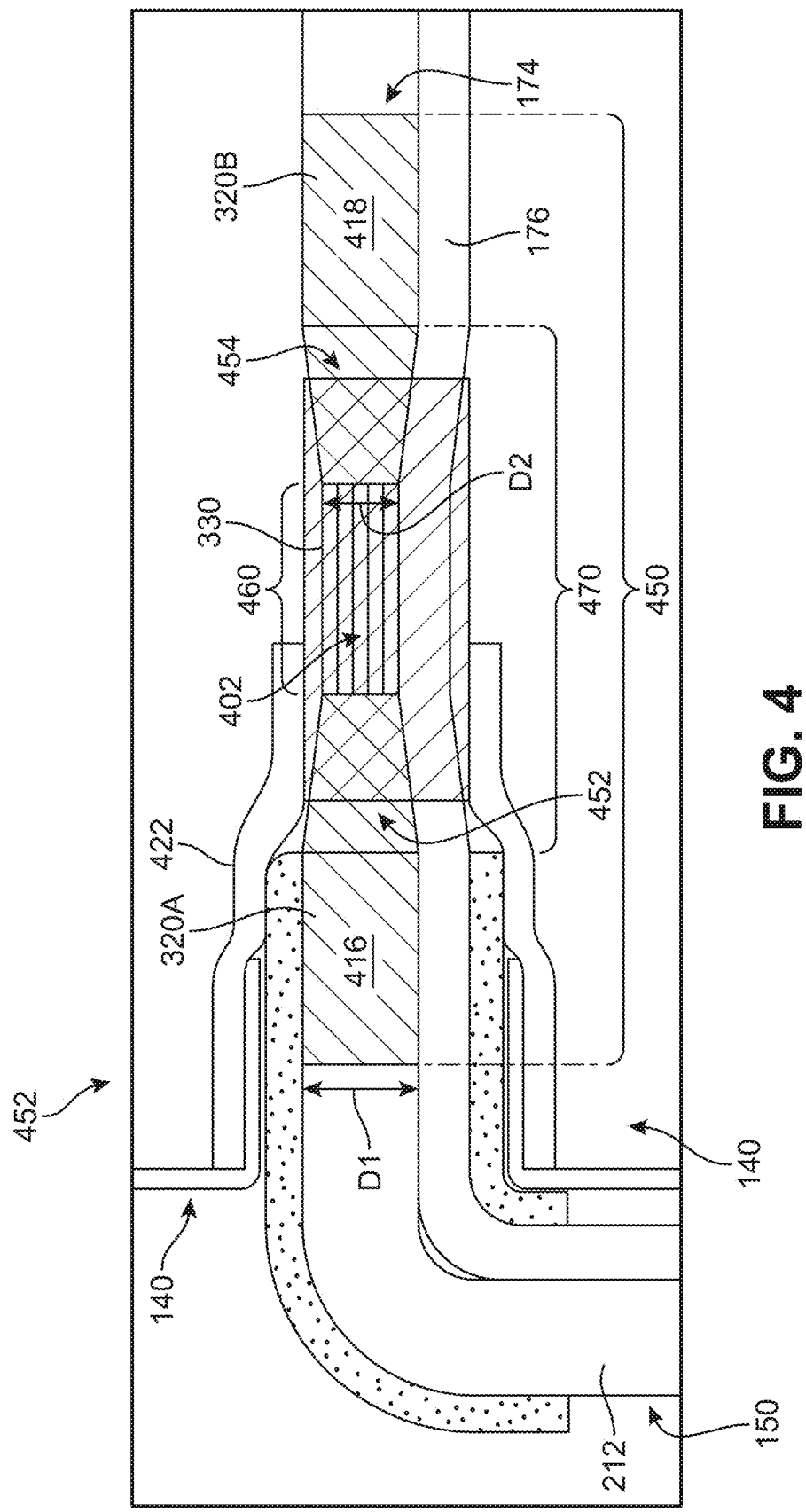
FIG. 4 is a schematic view of a portion of the sealing system of FIG. 1B, according to an embodiment.

For purposes of clarity, additional details regarding the arrangement are also provided with reference to FIG. 4, which depicts a partial cross-sectional view of harness portion 452 that was identified in FIG. 1B. in different embodiments, as the wire harness assembly 150 travels through various components of the mirror assembly, and is routed through the plate body (not shown in FIG. 4), the first harness 174 and the second harness 176 are held together as a set but remain as two discrete components. However, it can be observed that a first segment 450 of the wire harness assembly 150 has a structural arrangement that differs from the rest of the wire harness assembly 150. Rather than having the first harness 174 remain enclosed in rigid encasing 212 throughout its journey from the mirror assembly to the vehicle, the first segment 450 is modified to enhance flexibility and the ability of the multiple harnesses to seal together by removal of the rigid encasing 212.

In this example, the hard, rigid encasing 212 has been cut away or otherwise removed from what will be referred to as a flexible segment 450 of the first wire harness 174. Some or all of the flexible segment 450 can also include an intermediate region 460. The intermediate region 460 can refer to a portion of the first harness 174 where the outer rigid tubing has been removed and no additional covering is applied directly to the pins and/or used to compress the pins. Thus, an internal set of pins 402 in the intermediate region 460 of the first wire harness 174 are exposed relative to their neighboring pin lengths in the first harness 174 that lie outside the intermediate region 460.

In some embodiments, the flexible segment 450 can further include portions that, while free of the rigid encasing 212, are nevertheless bound by another (more flexible) material. For example, the exposed intermediate region 460 of the first segment 450 is disposed or extends between a first region 416 of the flexible segment 450 on its distal side and a second region 418 of the flexible segment on its proximal side. In FIG. 4, it can be observed that first region 416 of the flexible segment 450 is bounded by flexible tape 320a and the second region 418 of the flexible segment 450 is bounded by flexible tape 320b that offers an encasement or non-rigid protective exterior skin that is far more flexible than the rigid encasing 212 and permits a gentle yet structurally supportive narrowing of the diameter of the first wire harness 174 as it approaches the intermediate region 460. In some embodiments, the flexible tape (320a, 320b) still allows some relative movement of the pins held within the tape and facilitate the decrease in diameter. In some embodiments, the flexible tape (320a, 320b) can be applied directly adjacent to the end of the rigid encasing 212 on both sides, allowing for a substantially continuous outer covering (i.e., no gaps or exposed pins between the two surfaces). In other embodiments, the flexible tape (320a, 320b) can be applied such that they are partially applied to the rigid encasing 212, ensuring a continuous (gap-free) coverage.

Furthermore, in some embodiments, as the distal side approaches the intermediate region 460 and the proximal side similarly approaches the intermediate region 460, a bow-tie zone 470 can be provided that includes a distal first wedged portion 452 of the first region 416 and a proximal second wedged portion 454 of the second region 418. In different embodiments, the internal pins in both of these portions are more compressed relative to the non-modified portions of the wire harness assembly 150 (e.g., with a first diameter D1), such that the bow-tie zone 470 has a decreased external circumference. For example, the overall diameter of the first wire harness 174 tapers along each wedge portion until arriving at the intermediate region 460 which has a minimal, second diameter D2 that is smaller than first diameter D1 as it remains uncovered by the flexible tape pieces. In different embodiments, by keeping the pins in the intermediate region 460 of the first harness 174 exposed, the pins in this area remain freer or more adjustable, permitting shifting in their relative arrangement to better accommodate their compression and a snug fit against the adjacent second harness 176.

In some embodiments, the modification can be substantially symmetrical relative to a vertical axis. For example, the first region 416 and the second region 418 can each be substantially equal in size and dimensions, and the intermediate region 460 can be centered between the two regions. However, in other embodiments, the first region 416 may differ in size and dimensions from the second region 418.

In some embodiments, as the two sides (first region 416 and second region 418) approach the intermediate region 460, the joining or seal between the first harness 174 and the second harness 176 in some of the bow-tie zone 470 can be reinforced by the application of soft wrapping 330 that can flexibly surround and securely hold the two together. In some embodiments, the soft wrapping 330 can completely extend over the intermediate region 460, as well as some or all of the surrounding portions of the wedged portions, as shown in FIG. 4. This wrapping can also serve to form a continuous internal space that is sealed and protected from the external environment, thereby providing a kind of substitute sheathing where the pins might have otherwise been undesirably exposed to contaminants, while retaining the flexibility needed between the pins and the second wire harness 176 in that particular zone. In different embodiments, the entire layered structure of the flexible segment 450 is configured to maximize the seal quality between the two or more wire harnesses as they travel through the plate body, out of the gasket, and into the vehicle. For example, in some embodiments, the seal is maximized at the intermediate region 460, where the flexible tape 320 can be removed, and the pins of the first harness 174 exposed to allow for optimal rearrangement of each pin's relative position along or against the outer surface of the second harness 176 (e.g., the exposed pins can naturally arrange around the profile of the adjacent second harness 176). In some embodiments, once wrapped, the intermediate region 460 can have a substantially three-sided irregular cross-sectional shape. For example, returning briefly to FIG. 3, the first wire harness 174 provides a substantially triangular cross-sectional shape while the second wire harness 176 includes a substantially circular cross-sectional shape. When coupled together, one side of the triangle can be pushed against an arc segment of the circle, and the remaining two sides of the triangle form an exterior shape that is continuous with a substantially continuous U-shaped outer perimeter of the adjoining second wire harness 176.

In different embodiments, the flexible segment 450 is positioned within the overall door mirror installation to prevent gapping. More specifically, in some embodiments, the flexible segment 450 can begin before it emerges from the gasket 140. In other words, at least a part of the first region 416 can be disposed within the gasket 140. In some embodiments, the stability and seal of wire harness assembly 150 can further be reinforced by the application of a foam sheath 422 around the structure. Some examples of this arrangement can be found in U.S. patent application Ser. No. 18/299,488 entitled "Sealing System and Method For Exterior Mirror" to May, et al., filed Apr. 12, 2023, the disclosure of which is incorporated by reference herein in its entirety. In some embodiments, some or all of the sealing techniques and features described herein may be combined with some or all of the sealing techniques and features disclosed in the Sealing System and Method For Exterior Mirror application without limitation.

Figure 5:
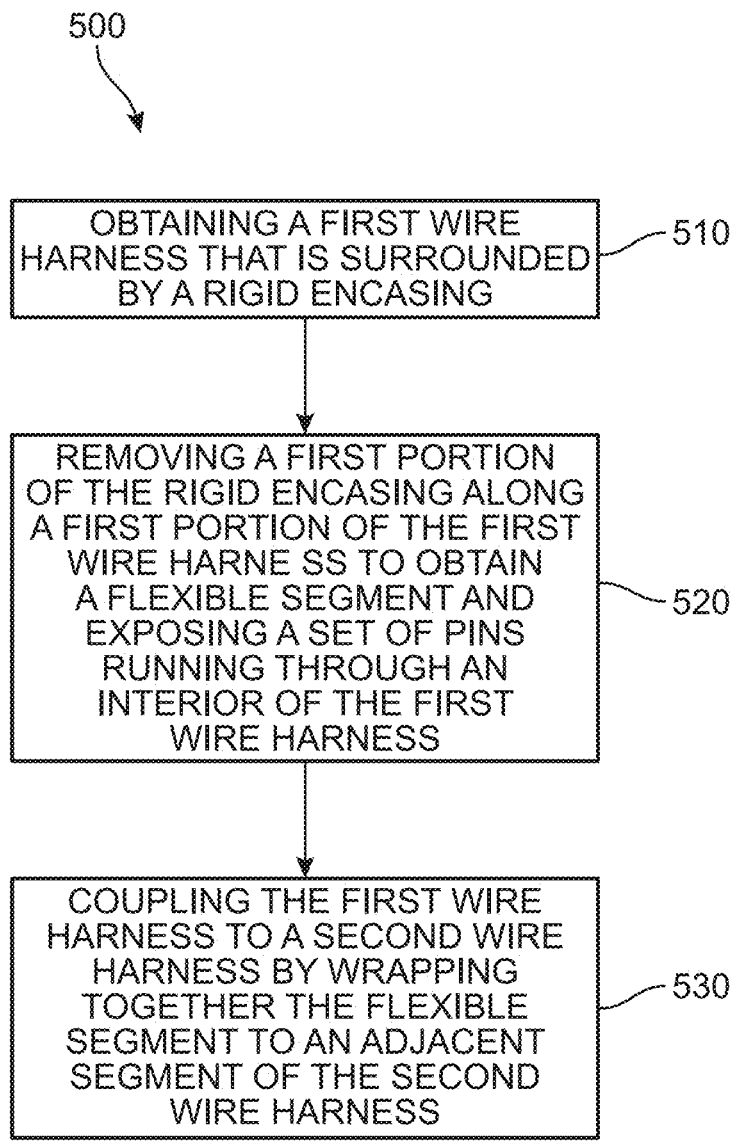
FIG. 5 is a flow chart depicting a method of sealing a wire harness assembly for a door mirror of a vehicle, according to an embodiment.

FIG. 5 is a flow chart illustrating an embodiment of a process of reducing wind noise associated with a mirror assembly for a vehicle by improving the sealing around the junction between the door mirror assembly and the vehicle. For example, a method 500 is directed to sealing a wire harness assembly for a door mirror assembly of a vehicle, and includes a step 510 of obtaining a first wire harness that is surrounded by a rigid encasing, and a step 520 of removing a first portion of the rigid encasing along a first portion of the first wire harness to obtain a flexible segment and exposing a set of pins running through an interior of the first wire harness. The method 500 also includes a step 530 of coupling the first wire harness to a second wire harness by wrapping together, using a fabric-based tape, the flexible segment to an adjacent segment of the second wire harness, thereby forming a wire harness assembly.

In different embodiments, the method 500 may include additional processes or aspects. In one example, the method can also include a step of wrapping a flexible thermoplastic tape directly around a first region of the set of pins before coupling the first wire harness to the second wire harness. In another example, the flexible thermoplastic tape overlaps from the first region of the flexible segment onto at least an adjacent peripheral portion of the rigid encasing, thereby forming a continuous seal.

In some embodiments, the method also includes a step of wrapping another (second piece of) flexible thermoplastic tape around a second region of the set of pins before coupling the first wire harness to the second wire harness, and the first region and the second region are spaced apart by an intermediate region in which the set of pins remain exposed. In some embodiments, the first region, second region, and intermediate region collectively form a bow-tie zone in which a diameter of the first wire harness decreases in a direction toward the intermediate region. In another example, the method also includes manipulating an arrangement of the set of pins in the intermediate region to approximately align with a profile contour of the adjacent segment of the second wire harness and improve their coupling fit. In still another example, the method can further include positioning the flexible segment such that the first region extends through a gasket protruding from a plate body of the door mirror assembly.

In different embodiments, the method may include also a step of encasing a portion of the gasket and the flexible segment in a foam sheath. In one embodiment, the rigid encasing comprises a high strength thermoplastic material. In some embodiments, the method also includes routing a plurality of pins through a rigid encasing to form the first wire harness. In one example, the rigid encasing is substantially tubular. In another example, the fabric-based tape includes felt. In some embodiments, the method further includes routing the wire harness assembly from a first electrical element in the door mirror assembly and through a plate body of the door mirror assembly for connection to the vehicle.

As disclosed herein, some embodiments include a sealing system for a wire harness assembly of a mirror assembly of a vehicle. The sealing system can include a first wire harness including a first segment and a second segment, the first segment being surrounded by a rigid encasing and the second segment including an intermediate region in which a plurality of pins traveling through the first segment and the second segment are exposed. In some cases, the first wire harness has its smallest diameter where the pins have been exposed and the rigid encasing removed. The sealing system can further include a second wire harness coupled to the first wire harness by a fabric-based tape wrapped around the second segment and an adjacent segment of the second wire harness. In some embodiments, the first segment has an approximately triangular cross-sectional shape. In another example, the second segment has an approximately circular cross-sectional shape. In one embodiment, the coupled first wire harness and second wire harness are configured to pass through a gasket protruding from a plate body for the mirror assembly. In some embodiments, the first wire harness further includes a third segment surrounded by the rigid encasing, and the second segment extends between the first segment and the third segment. In one example, the rigid encasing comprises a high strength thermoplastic material. In another example, a flexible thermoplastic tape overlaps from a first region of the second segment onto at least an adjacent peripheral portion of the rigid encasing on the first segment, thereby forming a continuous seal. Furthermore, the exposed pins have the freedom to move and alter their relative arrangement, allowing for a more aligned, flush fit against the second wire harness. This layered arrangement creates a full seal for the wire harness assembly from the proximal side to the distal side of the gasket. This type of seal using a set of flexible layers of tape eliminates the potential for wind noise caused by air traveling through the wire harness assembly by closing the gaps between the multiple harnesses.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

The invention claimed is:

1. A method of sealing a wire harness assembly for a door mirror assembly of a vehicle, the method comprising:
    obtaining a first wire harness that is surrounded by a rigid encasing;
    removing a first portion of the rigid encasing along a first portion of the first wire harness to obtain a flexible segment and exposing a set of pins running through an interior of the first wire harness; and
    coupling the first wire harness to a second wire harness by wrapping together, using a fabric-based tape, the flexible segment to an adjacent segment of the second wire harness, thereby forming a wire harness assembly.

2. The method of claim 1, further comprising wrapping a flexible thermoplastic tape directly around a first region of the set of pins before coupling the first wire harness to the second wire harness.

3. The method of claim 2, wherein the flexible thermoplastic tape overlaps from the first region of the flexible segment onto at least an adjacent peripheral portion of the rigid encasing, thereby forming a seal.

4. The method of claim 2, further comprising wrapping another flexible thermoplastic tape around a second region of the set of pins before coupling the first wire harness to the second wire harness, and the first region and the second region are spaced apart by an intermediate region in which the set of pins remain exposed.

5. The method of claim 4, wherein the first region, second region, and intermediate region collectively form a bow-tie zone in which a diameter of the first wire harness decreases in a direction toward the intermediate region.

6. The method of claim 4, further comprising manipulating an arrangement of the set of pins in the intermediate region to approximately align with a profile contour of the adjacent segment of the second wire harness and improve their coupling fit.

7. The method of claim 4, further comprising positioning the flexible segment such that the first region extends through a gasket protruding from a plate body of the door mirror assembly.

8. The method of claim 7, further comprising encasing a portion of the gasket and the flexible segment in a foam sheath.

9. The method of claim 1, wherein the rigid encasing comprises a high strength thermoplastic material.

10. The method of claim 1, further comprising routing a plurality of pins through a rigid encasing to form the first wire harness.

11. The method of claim 1, wherein the rigid encasing is substantially tubular.

12. The method of claim 1, wherein the fabric-based tape includes felt.

13. The method of claim 1, further comprising routing the wire harness assembly from a first electrical element in the door mirror assembly and through a plate body of the door mirror assembly for connection to the vehicle.

14. A sealing system for a wire harness assembly of a mirror assembly of a vehicle, the sealing system comprising:
    a first wire harness including a first segment and a second segment, the first segment being surrounded by a rigid encasing and the second segment including an intermediate region in which a plurality of pins traveling through the first segment and the second segment are exposed; and
    a second wire harness coupled to the first wire harness by a fabric-based tape wrapped around the second segment and an adjacent segment of the second wire harness.

15. The sealing system of claim 14, wherein the first segment has an approximately triangular cross-sectional shape.

16. The sealing system of claim 15, wherein the second segment has an approximately circular cross-sectional shape.

17. The sealing system of claim 14, wherein the coupled first wire harness and second wire harness are configured to pass through a gasket protruding from a plate body for the mirror assembly.

18. The sealing system of claim 14, wherein the first wire harness further includes a third segment surrounded by the rigid encasing, and the second segment extends between the first segment and the third segment.

19. The sealing system of claim 14, wherein the rigid encasing comprises a high strength thermoplastic material.

20. The sealing system of claim 14, wherein a flexible thermoplastic tape overlaps from a first region of the second segment onto at least an adjacent peripheral portion of the rigid encasing on the first segment, thereby forming a seal.

* * * * *